US012071872B1

(12) United States Patent
Wang et al.

(10) Patent No.: US 12,071,872 B1
(45) Date of Patent: Aug. 27, 2024

(54) COMPRESSOR HOUSING PCV FOR REDUCING CRANKCASE PRESSURE

(71) Applicant: GM GLOBAL TECHNOLOGY OPERATIONS LLC, Detroit, MI (US)

(72) Inventors: Fengkun Wang, Rochester Hills, MI (US); Carnell E. Williams, Ortonville, MI (US); Chijou Wang, Farmington Hills, MI (US); Maxwell Tyler Doiron, Hazel Park, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 18/117,739

(22) Filed: Mar. 6, 2023

(51) Int. Cl.
*F01M 13/02* (2006.01)
*F02M 25/06* (2016.01)

(52) U.S. Cl.
CPC .......... *F01M 13/021* (2013.01); *F02M 25/06* (2013.01); *F01M 2013/026* (2013.01); *F01M 2013/027* (2013.01)

(58) Field of Classification Search
CPC ........... F01M 13/021; F01M 2013/026; F01M 2013/027; F02M 25/06
See application file for complete search history.

(56) References Cited

U.S. PATENT DOCUMENTS

| | | | | | |
|---|---|---|---|---|---|
| 6,123,061 | A * | 9/2000 | Baker | F01M 13/021 123/573 |
| 6,554,568 | B2 | 4/2003 | Fledersbacher et al. | |
| 9,670,881 | B2 | 6/2017 | Shioda | |
| 10,508,627 | B2 | 12/2019 | Kim et al. | |
| 11,415,141 | B1 | 8/2022 | Wang et al. | |
| 11,655,753 | B2 * | 5/2023 | Kong | F02B 33/44 60/605.1 |
| 2002/0002968 | A1 * | 1/2002 | Gillespie | F02B 77/10 123/572 |
| 2008/0314351 | A1 * | 12/2008 | Ryrholm | F02M 35/10222 123/184.47 |
| 2012/0297768 | A1 | 11/2012 | Lischer | |
| 2013/0014503 | A1 | 1/2013 | Romblom et al. | |
| 2015/0136096 | A1 | 5/2015 | Shioda | |

* cited by examiner

*Primary Examiner* — J. Todd Newton
(74) *Attorney, Agent, or Firm* — Harness, Dickey & Pierce, P.L.C.

(57) ABSTRACT

A compressor assembly includes a compressor housing having an inlet port configured to receive intake air and an outlet port configured to discharge pressurized air. A hollow section having an inner radial surface defines the inlet port of the compressor housing. A compressor wheel is disposed in the hollow section. A positive crankcase ventilation (PCV) passage is configured to allow airflow between a crankcase of an engine and the hollow section of the compressor housing. The PCV passage has an outlet opening that opens into the hollow section of the compressor housing and the inner radial surface includes an integrally formed raised boss surrounding the outlet opening and protruding into the hollow section.

19 Claims, 5 Drawing Sheets

COMPRESSOR HOUSING PCV FOR REDUCING CRANKCASE PRESSURE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to an engine system with a compressor that reduces crankcase pressure.

Some engine systems include a centrifugal compressor that increases the pressure of intake air delivered to an intake manifold of an engine. A centrifugal compressor typically includes an inlet, a compressor wheel, a diffuser, and a collector. The inlet receives ambient air and is typically defined by a pipe. The compressor wheel typically includes a rotating set of vanes (or blades) that draw air through the inlet and send the air radially outward. In a turbocharged engine, the compressor wheel is driven by a turbine that is propelled by exhaust gas produced by the engine. In a supercharged engine, the compressor wheel is driven by a crankshaft of the engine or by an electric motor. The diffuser reduces the velocity of air discharged by the compressor wheel. The collector gathers air discharged by the diffuser and delivers the air to a downstream pipe that is connected to the intake manifold of the engine. The inlet and the collector are typically formed by a compressor housing.

The positive crankcase ventilation (PCV) system delivers blow-by gases from a crankcase of an engine to a combustion chamber of the engine. Gases in a crankcase include blow-by gases that have leaked from the combustion chamber and passed through piston rings. PCV systems typically include a PCV tube, a PCV valve, and a vacuum source such as an intake manifold of an engine. The PCV tube provides a passageway for gases to flow from the crankcase to the vacuum source. In engine systems that do not include a centrifugal compressor, the PCV passage typically communicates with the intake manifold of an engine. In engine systems that do include a centrifugal compressor, the PCV passage typically communicates with the compressor housing. The PCV valve controls the flow of gases from the crankcase to the vacuum source. The vacuum source draws the gases from the crankcase.

As discussed above, in engine systems that include a centrifugal compressor, a PCV passage typically opens into the compressor housing to enable gases to flow from a crankcase of an engine to an intake manifold of the engine. In one example, the compressor housing includes a hollow section that forms the air inlet of the compressor. The hollow section has an inner radial surface. When the compressor is operating near its surge line (i.e., when the operating conditions of the compressor are near surge conditions), a positive pressure layer may form near the inner radial surface of the compressor housing. This may lead to high crankcase pressure.

SUMMARY

To address the issue of high crankcase pressure, a compressor assembly according to the present disclosure includes a positive crankcase ventilation (PCV) passage that opens through an inner radial surface of the air inlet of a compressor housing. The outlet opening of the PCV passage is surrounded by a raised boss that interrupts a high pressure layer that forms along the inner radial surface of the compressor housing. The amount by which the raised boss surrounding the PCV outlet opening protrudes from the inner radial surface of the compressor housing strikes a balance between avoiding turbulence in the inlet port and avoiding high crankcase pressure.

According to an aspect of the present disclosure, a compressor assembly includes a compressor housing having an inlet port configured to receive intake air and an outlet port configured to discharge pressurized air. A hollow section having an inner radial surface defines the inlet port of the compressor housing. A compressor wheel is disposed in the hollow section. A positive crankcase ventilation (PCV) passage is configured to allow airflow between a crankcase of an engine and the hollow section of the compressor housing. The PCV passage has an outlet opening that opens into the hollow section of the compressor housing and the inner radial surface includes an integrally formed raised boss surrounding the outlet opening and protruding into the hollow section.

According to a further aspect, the raised boss protrudes from the inner radial surface of the compressor housing by an amount that is within a range from 1 millimeters (mm) to 9 mm.

According to a further aspect, the raised boss protrudes from the inner radial surface of the compressor housing by at least 2 mm.

According to a further aspect, the compressor housing further includes a hollow toroidal section that defines a compressor collector configured to gather pressurized air flowing radially outward and directs the pressurized air toward the outlet port of the compressor housing.

According to a further aspect, the hollow cylindrical section has a first end that defines an entrance to the inlet port and a second end opposite of the first end; and the hollow toroidal section is joined to the hollow cylindrical section adjacent to the second end thereof.

According to a further aspect, the compressor housing further includes a curved tubular section having a first end and a second end opposite of the first end; the first end of the curved tubular section is joined to both the hollow section and the hollow toroidal section; and the second end of the curved tubular section forms the outlet port of the compressor housing.

According to a further aspect, the raised boss is tear drop shaped.

According to a further aspect, the tear drop shaped raised boss includes an upstream end having a V-shape and a downstream end having a curved shape.

According to another aspect, an engine system includes a crankcase and a centrifugal compressor having a compressor housing having an inlet port configured to receive intake air, an outlet port configured to discharge pressurized air, a hollow section having an inner radial surface defining the inlet port of the compressor housing and a compressor wheel disposed in the hollow section. A positive crankcase ventilation (PCV) passage includes an outlet that opens into the hollow section of the compressor housing and the inner radial surface including an integrally formed raised boss surrounding the outlet and protruding into the hollow section. A PCV line connects the crankcase to the PCV passage to allow airflow between the crankcase and the inlet port of the compressor housing.

According to a further aspect, the raised boss protrudes from the inner radial surface of the compressor housing by an amount that is within a range from 1 millimeters (mm) to 9 mm.

According to a further aspect, the raised boss protrudes from the inner radial surface of the compressor housing by at least 2 mm.

According to a further aspect, the compressor housing further includes a hollow toroidal section that defines a compressor collector configured to gather pressurized air flowing radially outward and directs the pressurized air toward the outlet port of the compressor housing.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
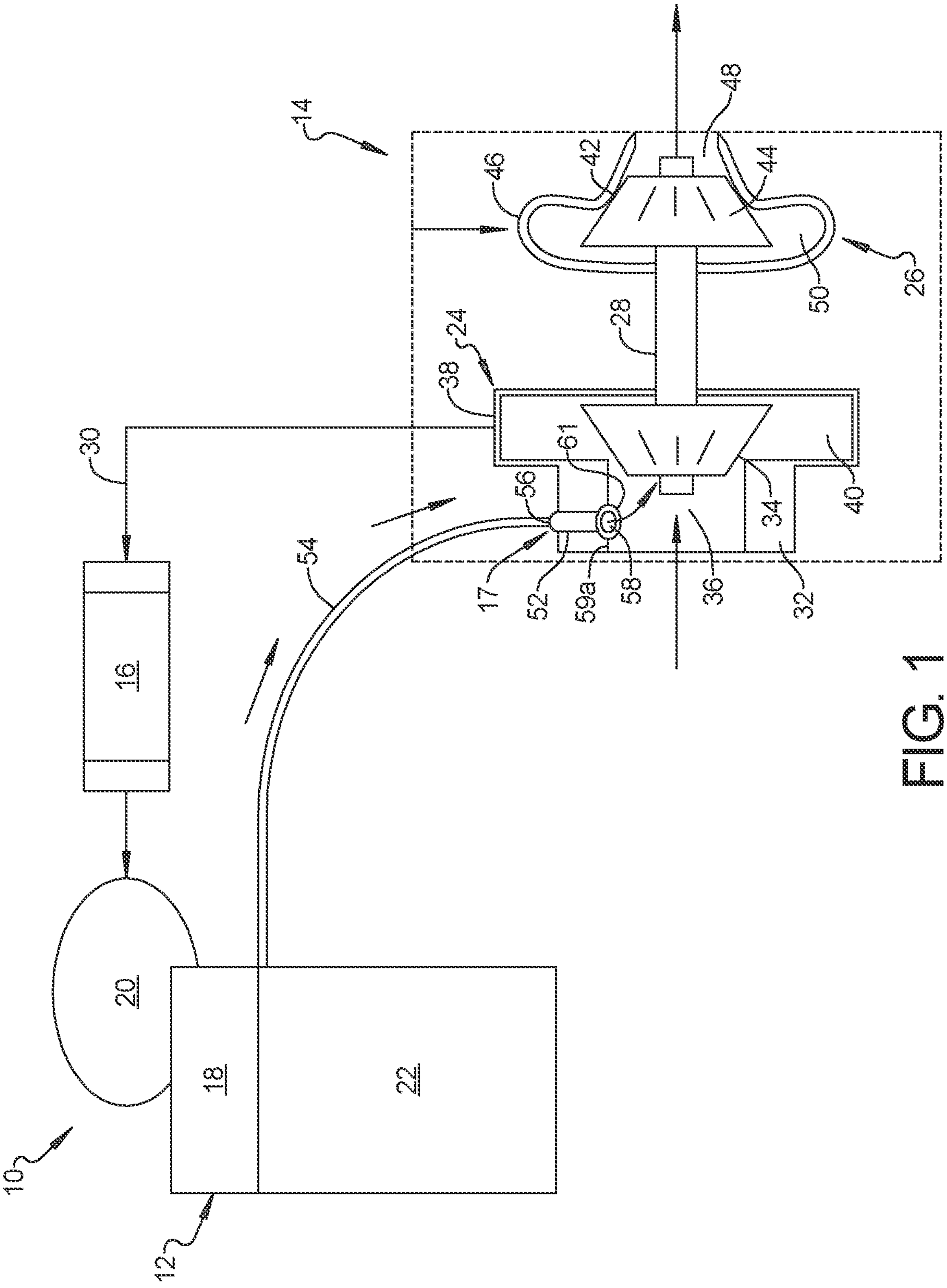
FIG. 1 is a functional block diagram of an engine system according to the principles of the present disclosure.

Referring now to FIG. 1, an engine system 10 includes an engine 12, a turbocharger 14, a charge air cooler 16, and a positive crankcase ventilation (PCV) system 17. The engine 12 includes an engine block 18, an intake manifold 20, and a crankcase 22. The engine block 18 defines one or more cylinders (not shown). The intake manifold 20 delivers intake air to the cylinders. One or more fuel injectors (not shown) inject fuel that is mixed with the intake air to form an air/fuel mixture, and the air/fuel mixture is combusted within the cylinders. Combustion of the air/fuel mixture causes pistons (not shown) to reciprocate within the cylinders, which rotates a crankshaft (not shown) and produces drive torque. The crankcase 22 houses the crankshaft.

The turbocharger 14 includes a centrifugal compressor 24, a turbine 26, and a shaft 28 connecting the compressor 24 to the turbine 26. The compressor 24 pressurizes intake air, and an intake air line 30 delivers the pressurized intake air to the intake manifold 20. The compressor 24 includes a compressor housing 32 and a compressor wheel 34 disposed within the compressor housing 32. The compressor housing 32 defines an air inlet 36, an outlet port 38, and a compressor collector 40. As the compressor wheel 34 rotates, the compressor wheel 34 draws air at ambient pressure through the air inlet 36 and sends pressurized air radially outward to the collector 40. The collector 40 gathers the pressurized air flowing radially outward and sends the pressurized air to the outlet port 38, which discharges the pressurized air to the intake air line 30.

As is known in the art, the turbine 26 is driven by exhaust gas produced by the engine 12 and drives the compressor 24. The turbine 26 includes a turbine housing 42 and an impeller 44 disposed within the turbine housing 42. The turbine housing 42 defines an inlet port 46, an outlet port 48, and a volute 50. Exhaust gas from the engine 12 enters the turbine housing 42 through the inlet port 46, flows through the volute 50 and past the impeller 44, and exits the turbine housing 42 through the outlet port 48. As the exhaust gas flows past the impeller 44, the exhaust gas causes the impeller 44 to rotate. The shaft 28 connects the compressor wheel 34 to the impeller 44 of the turbine 26. Thus, the compressor wheel 34 rotates with the impeller 44 of the turbine 26. Although the compressor 24 is described herein as being part of a turbocharger and driven by a turbine, the compressor 24 may instead be driven by the crankshaft of the engine 12 or by an electric motor (not shown).

The charge air cooler 16 is disposed in the intake air line 30 and cools pressurized air passing through the intake air line 30. The positive crankcase ventilation (PCV) system 17 includes a PCV passage 52 and a PCV line 54 extending from the crankcase 22 to the PCV passage 52. The PCV line 54 delivers gases from the crankcase 22 to the PCV passage 52. The PCV passage 52 has an inlet 56 that receives crankcase gases from the PCV line 54 and an outlet 58 that discharges the crankcase gases to the air inlet 36 of the compressor 24. The PCV passage 52 has an outlet 58 that opens through an inner radial surface **59*a* of the compressor housing 32 into the air inlet 36 of the compressor 24. The PCV passage outlet 58 is surrounded by a raised boss 61 that projects from the inner radial surface 59*a* of the compressor housing 32 by an amount that ensures the outlet 58 of the PCV passage 52 is within a negative pressure layer of the air inlet 36 in all operating conditions of the compressor 24. In the example shown, the raised boss 61 is formed integral with the inner radial surface 59*a* of the compressor housing 32. The PCV passage 52 may be formed (e.g., machined or casted) within the compressor housing 32**.

Figure 2:
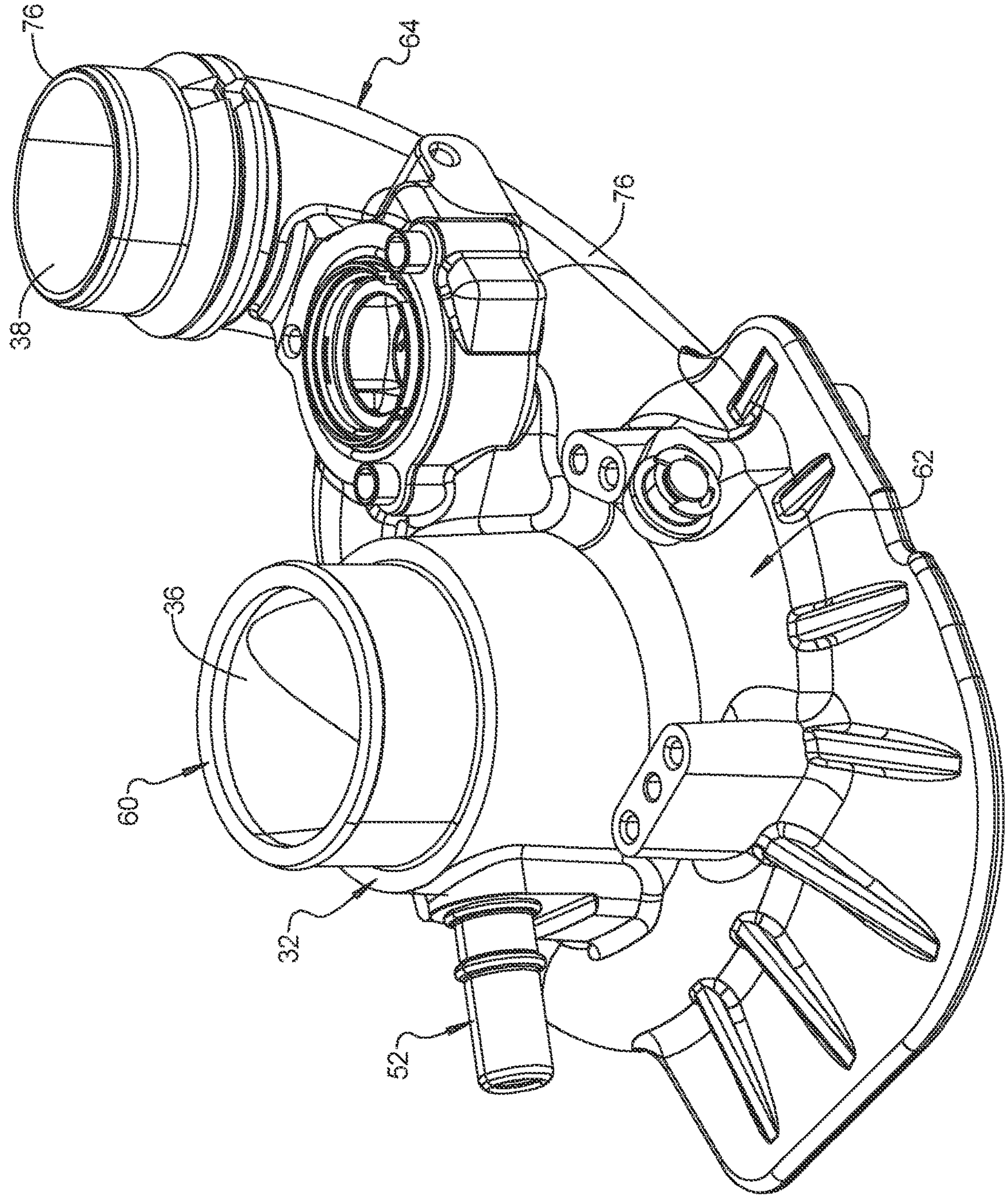
FIG. 2 is a perspective view of the compressor housing according to the principles of the present disclosure.
Figure 3:
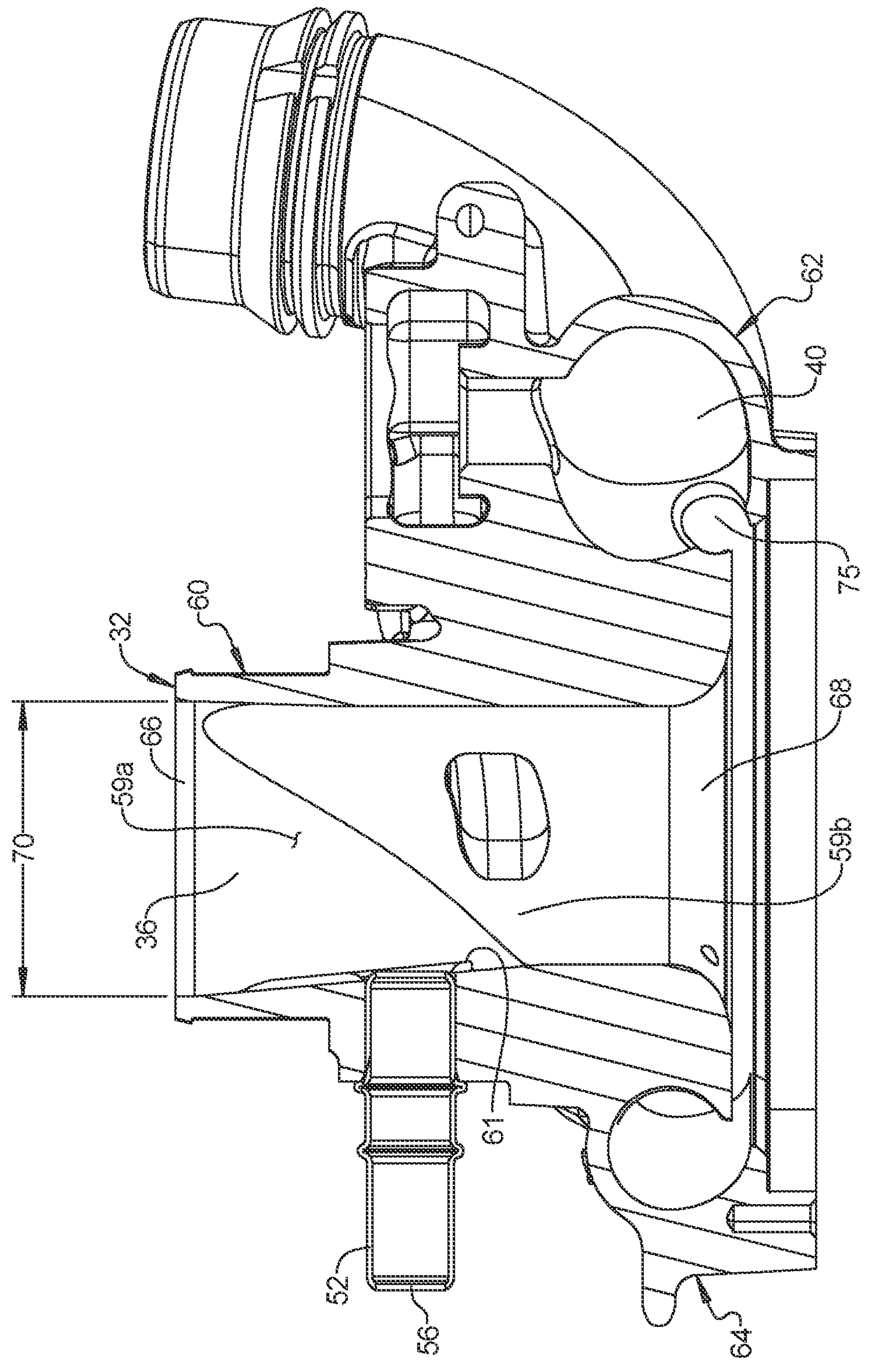
FIG. 3 is a section view of the compressor housing and the PCV passage.

Referring now to FIGS. 2 and 3, the compressor housing 32 includes a hollow cylindrical section 60, a hollow toroidal section 62, and a curved tubular section 64. With reference to FIG. 3, the hollow cylindrical section 60 has a first end 66 that forms an entrance port to the air inlet 36 and a second end 68 opposite of the first end 66. The hollow section 60 also has the inner radial surface 59. The inner radial surface 59 of the hollow section 60 defines an inwardly tapering diameter 70 extending from the first end 66 of the air inlet 36. In the example shown, the hollow section 60 is cast and the upstream section **59*a* tapers inward from its first end 66 toward its second end 68. A cylindrical wall section 59*b* is machined to be cylindrical. The tapered upstream section 59*a* of the inner radial surface 59*a*, 59*b* allows the raised boss 61 to be cast integral with the compressor housing without interfering with the machining of the cylindrical wall section 59*b***.

The hollow toroidal section 62 is joined to the hollow cylindrical section 60 adjacent to (or at) the second end 68 thereof. The hollow toroidal section 62 defines the compressor collector 40. The collector 40 gathers pressurized air that is sent radially outward by the compressor wheel 34 (FIG. 1), and sends the pressurized air toward the outlet port 38 of the compressor housing 32 through the curved tubular section 64. The vanes of the compressor wheel 34 may be disposed in the inlet port 36 adjacent to the second end 68 and may extend into an annular passage 75 that allows air to flow radially outward from the inlet port 36 to the collector 40. The annular passage 75 is formed by the hollow cylindrical section 60 and/or the hollow toroidal section 62.

Figure 4:
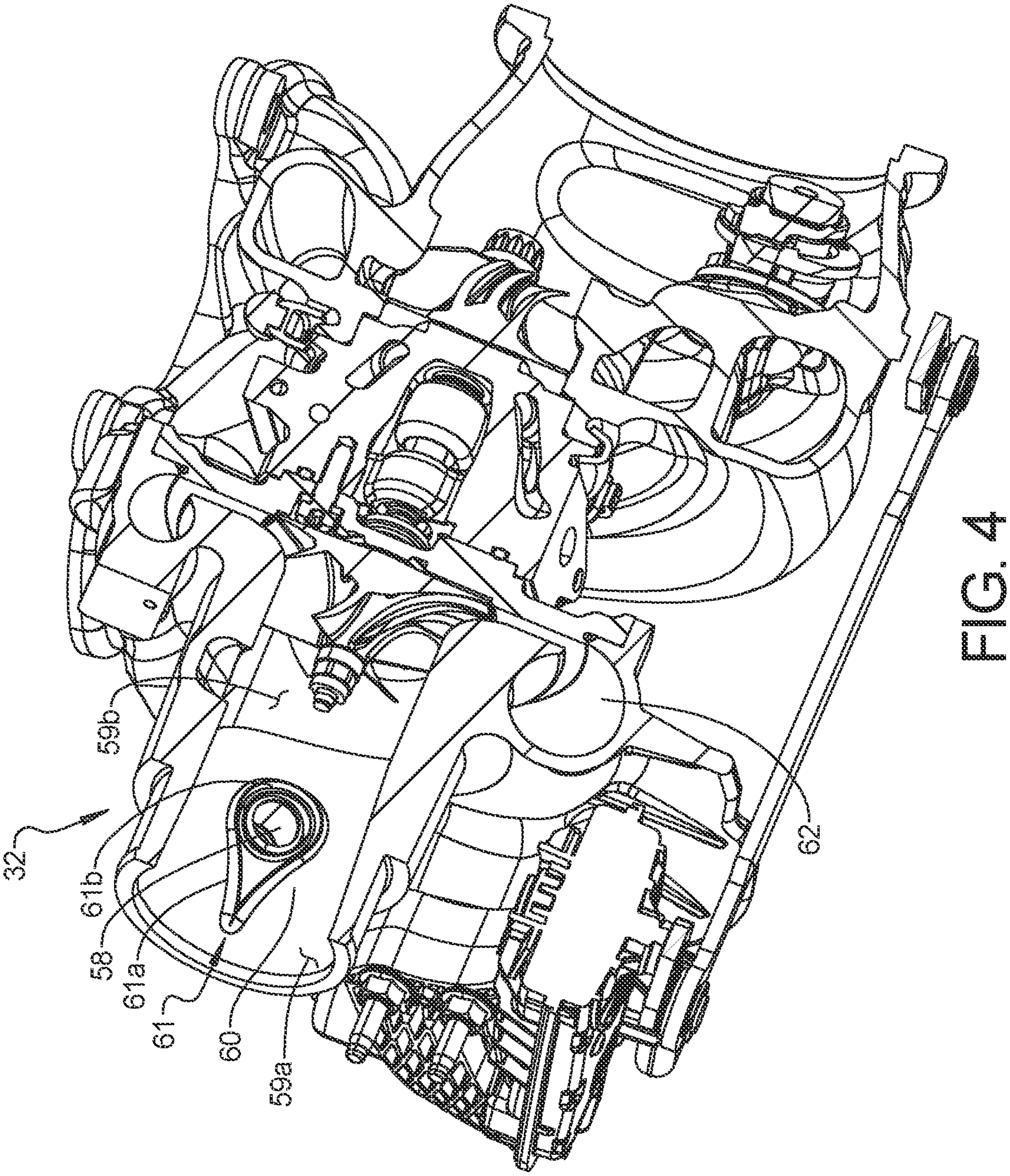
FIG. 4 is a partial cutaway perspective view of compressor housing and the PCV passage according to the present disclosure.

The raised boss 61 extends radially inward beyond the inner radial surface 59 of the hollow section 60 by a distance "h" that strikes a balance between avoiding turbulence in the air inlet 36 and avoiding high crankcase pressure. In one example, the distance h is within a range from 1 mm to 10 mm. According to one embodiment, the distance h is at least 2 mm. As shown in FIG. 4, the raised boss 61 can be tear drop shaped with a V-shaped portion 61*a* extending in an upstream direction and a radiused portion 61*b* extending in the downstream direction.

Figure 5:
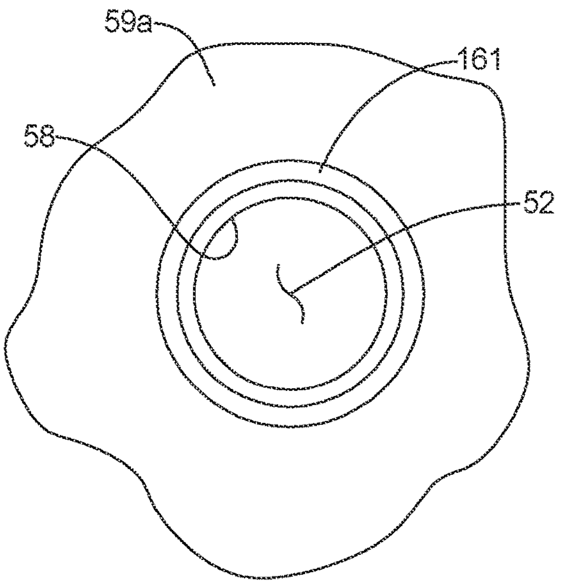
FIG. 5 is a plan view of an example circular raised boss surrounding the PCV outlet opening.
Figure 6:
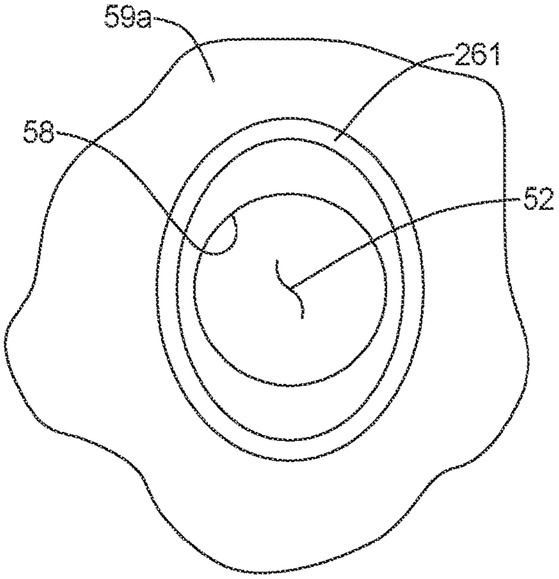
FIG. 6 is a plan view of an example oval raised boss surrounding the PCV outlet opening.
Figure 7:
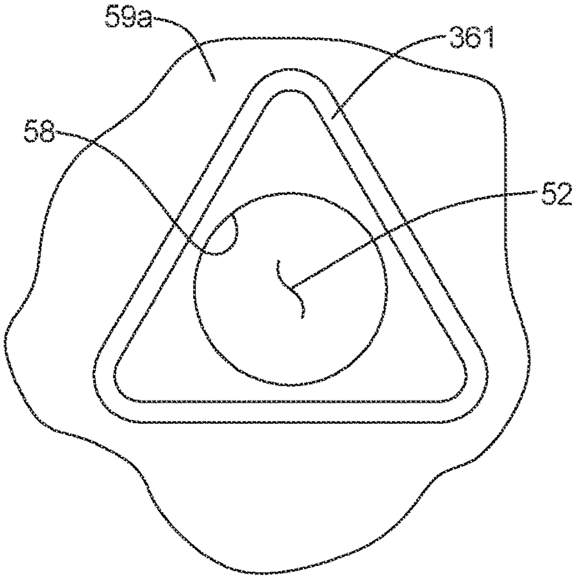
FIG. 7 is a plan view of an example triangular raised boss surrounding the PCV outlet opening.

Air flowing through the compressor housing 32 and the PCV passage 52 passes through pressure layers (or zones) when the compressor 24 is operating near its surge line. In one example, a positive pressure layer forms near the inner radial surface 59 of the compressor housing 32 when the compressor 24 is operating near its surge line. The V-shaped portion 61*a* is intended to reduce turbulence in the inlet air stream and the radiused portion 61*b* is intended to disrupt the positive pressure layer that forms along the inner radial surface 59 from traveling up the PCV passage to the crankcase. It should be understood that although the raised boss 61 is shown as teardrop shaped, other shapes such as circular, oval, and triangular could also be used. FIG. 5 is a plan view of an example circular raised boss 161 surrounding the PCV outlet opening. FIG. 6 is a plan view of an example oval raised boss 261 surrounding the PCV outlet opening. FIG. 7 is a plan view of an example triangular raised boss 361 surrounding the PCV outlet opening.

The raised boss 61 surrounding the PCV passage 52 extends radially inward above the inner radial surface 59 of the compressor housing 32 and past the positive pressure layer that can form along the inner radial surface to a negative pressure layer. Thus, air flowing through the PCV passage 52 is at a negative pressure, and the crankcase pressure is also negative. If the raised boss 61 did not extend radially inward past the positive pressure layer 90 along the inner radial surface, the PCV passage 52 may be at a positive pressure, and the crankcase pressure may also be positive.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent versus "directly adjacent," etc.).

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "and/or" includes any and all combinations of one or more of the associated listed items. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A compressor assembly comprising:

a compressor housing having an inlet port configured to receive intake air, an outlet port configured to discharge pressurized air, and a hollow section having an inner radial surface defining the inlet port of the compressor housing;

a compressor wheel disposed in the hollow section; and a positive crankcase ventilation (PCV) passage configured to allow airflow between a crankcase of an engine and the hollow section of the compressor housing, the PCV passage having an outlet opening that opens into the hollow section of the compressor housing and the inner radial surface including an integrally formed raised boss surrounding the outlet opening and protruding into the hollow section further than the outlet opening.

2. The compressor assembly of claim 1, wherein the raised boss extends beyond the inner radial surface of the compressor housing by an amount that is within a range from 1 millimeters (mm) to 9 mm.

3. The compressor assembly of claim 2, wherein the raised boss extends beyond the inner radial surface of the compressor housing by at least 2 mm.

4. The compressor assembly of claim 1, wherein the compressor housing further includes a hollow toroidal section that defines a compressor collector configured to gather pressurized air flowing radially outward and to send the pressurized air toward the outlet port of the compressor housing.

5. The compressor assembly of claim 4, wherein:

the hollow cylindrical section has a first end that defines an entrance to the inlet port and a second end opposite of the first end; and the hollow toroidal section is joined to the hollow section adjacent to the second end thereof.

6. The compressor assembly of claim 4, wherein:

the compressor housing further includes a curved tubular section having a first end and a second end opposite of the first end;

the first end of the curved tubular section is joined to both the hollow section and the hollow toroidal section; and the second end of the curved tubular section forms the outlet port of the compressor housing.

7. The compressor assembly of claim 1, wherein the raised boss is tear drop shaped.

8. The compressor assembly of claim 7, wherein the tear drop shaped raised boss includes an upstream end having a V-shape and a downstream end having a curved shape.

9. The compressor assembly of claim 1, wherein the raised boss is circular.

10. The compressor assembly of claim 1, wherein the raised boss is oval.

11. The compressor assembly of claim 1, wherein the raised boss is triangular.

12. An engine system comprising:

a crankcase;

a centrifugal compressor including a compressor housing having an inlet port configured to receive intake air, an outlet port configured to discharge pressurized air, a hollow section having an inner radial surface defining the inlet port of the compressor housing and a compressor wheel disposed in the hollow section;

a positive crankcase ventilation (PCV) passage having an outlet that open into the hollow section of the compressor housing and beyond the inner radial surface of the hollow cylindrical section and the inner radial surface including an integrally formed raised boss surrounding the outlet and protruding into the hollow section further than the outlet; and a PCV line connecting the crankcase to the PCV passage to allow airflow between the crankcase and the inlet port of the compressor housing.

13. The engine system of claim 12, wherein the raised boss extends beyond the inner radial surface of the compressor housing by an amount that is within a range from 1 millimeters (mm) to 9 mm.

14. The engine system of claim 13, wherein the raised boss extends beyond the inner radial surface of the compressor housing by at least 2 mm.

15. The engine system of claim 12, wherein the compressor housing further includes a hollow toroidal section that defines a compressor collector configured to gather pressurized air flowing radially outward and to send the pressurized air toward the outlet port of the compressor housing.

16. The engine system of claim 15, wherein:

the hollow cylindrical section has a first end that defines an entrance to the inlet port and a second end opposite of the first end; and the hollow toroidal section is joined to the hollow section adjacent to the second end thereof.

17. The engine system of claim 15, wherein:

the compressor housing further includes a curved tubular section having a first end and a second end opposite of the first end;

the first end of the curved tubular section is joined to both the hollow section and the hollow toroidal section; and the second end of the curved tubular section forms the outlet port of the compressor housing.

18. The engine system of claim 12, wherein the raised boss is tear drop shaped.

19. The engine system of claim 18, wherein the tear drop shaped raised boss includes an upstream end having a V-shape and a downstream end having a curved shape.

* * * * *